Aug. 10, 1965  A. BESSLER ETAL  3,199,635
SPOT TYPE DISK BRAKE

Filed March 5, 1964  2 Sheets-Sheet 1

ALFRED BESSLER
HEINZ RABE
HEINZ DOBBELSTEIN
HERMANN VON EY
        INVENTOR.

BY  *Mestern, Ross & Mestern*

Aug. 10, 1965  A. BESSLER ETAL  3,199,635
SPOT TYPE DISK BRAKE
Filed March 5, 1964  2 Sheets-Sheet 2

ALFRED BESSLER
HEINZ RABE
HEINZ DOBBELSTEIN
HERMANN VON EY
INVENTOR.

BY *Masters, Ross & Mestern*

United States Patent Office 3,199,635
Patented Aug. 10, 1965

3,199,635
SPOT TYPE DISK BRAKE
Alfred Bessler, Heinz Rabe, Heinz Dobbelstein, and Hermann Von Ey, all of Gifhorn, Germany, assignors to Alfred Teves Maschinen- und Armaturenfabrik K.G.
Filed Mar. 5, 1964, Ser. No. 349,776
7 Claims. (Cl. 188—73)

Our present invention relates to segmental disk brakes and, more partciularly, to fluid-operated disk brakes of the type wherein a pair of brake shoes, juxtaposed with a brake disk, are more or less simultaneously drawn into engagement with the braking faces of the disk by means of a mechanism including a yoke member bridging the opposite sides of the disk.

There have been proposed many mechanisms for the application of brake surfaces to a disk under the control of manual or fluid-responsive actuating means. For the most part, however, such earlier devices were incapable of effecting a precise relative displacement of the movable members of the disk brake so that nonuniform wear of the brake shoes was generally encountered. Moreover, these systems relied upon massive yoke or bridge members, e.g., of saddle-shaped configuration, to eliminate any tendency for the C-shaped yoke to deform under braking pressures. Such yokes are incapable, in many instances, of withstanding the large bending moments encountered in disk-brake systems. The saddle shape of the yoke most often resulted in an increase of the nonuniform wear of the brake shoes as a consequence of the bending action.

It is the principal object of the present invention to provide a disk brake wherein the aforementioned disadvantages are avoided.

Another object of this invention is to provide a disk-brake system wherein brake-shoe wear occurs uniformly in contradistinction to earlier systems in which nonuniform erosion of the brake shoes predominates.

These objects and others which will become apparent hereinafter are attained, in accordance with the present invention, through the provision of a disk brake which, according to an essential feature of this invention, comprises a support member, a brake member displaceable relative to the support member for shifting a brake surface thereon toward and away from a brake disk journaled for rotation relative to the support member, a yoke member of generally C-shaped configuration extending around the periphery of the disk while being shiftable relatively to the brake member and having a braking surface engageable with another face of the disk, and guide-rod means extended transversely to the faces and slidably interconnecting the support and brake members as well as the brake and yoke members for relative displacement transverse to the braking faces of the disk. Each of the guide-rod means comprises at least one elongated element slidably received within a passage formed in the member relative to which the member carrying the guide element is slidably displaceable. This construction ensures that the relative displacement of each of the pairs of members mentioned above takes place only in a direction transverse to the disk in a precise manner, thereby obviating any tendency toward nonuniform wear of the braking surfaces of the shoes.

According to another feature of this invention, the fluid-responsive actuating means for shifting the brake and yoke members jointly toward and away from the disk comprises a fluid cylinder on the brake member (preferably integral therewith) and a piston received within the cylinder and bearing upon one flange of the yoke member whose other flange is provided with a brake shoe and is juxtaposed with the disk. To ensure a positive guidance of the relatively displaceable members via the respectvie guide-rod means, each of the latter includes at least one annular body of an elastomeric material surrounding the respective guide element and interposed between the latter and the wall of the respective passage. These rings, preferably composed of rubber serve to provide an adhesive pressure against the axial displacement of the relatively displaceable members, this adhesion force being overcome by the hydraulic pressure of the actuating means. The importance of this adhesion force cannot be underestimated since, as will be apparent, high centrifugal forces tend to separate the relatively displaceable members especially when the automotive vehicle in which the brake is incorporated swings at high speeds through turns and curves. When the annular bodies are O-rings, they are initially deformed upon actuation of the brakes and, in attempting to return to their original shape, act as restoring means drawing the brake shoes away from the disk when the brake is inactivated. The rings, moreover, serve as adjusting means for the wear of the brake shoe since, unlike most other restoring means, excessive play in the brake will cause slippage between the ring and the surface engaged thereby although distortion of the ring is maintained. The ring may, of course, be seated in a groove formed in the wall of the passage or an annular groove provided in the guide element.

According to yet another feature of this invention, the saddle-shaped yoke members of earlier devices are eliminated and replaced by a yoke which comprises a pair of flanges or cheeks extending along opposite sides of the disk and interconnected by at least one but preferably a plurality of elongated guide elements of the type described above. The flanges, however, are formed with extensions projecting radially outwardly beyond the guide elements and abuttingly engaged by an elongated compression element which serves to stiffen the yoke. Thus the guide elements constitute the equivalent of a tension flange in a structural member while the compression element serves as the compression flange. In this manner the yoke can be composed of steel and be relatively light-weight without the danger of bending.

A more specific feature of this invention resides in the provision of manual actuating means, preferably in conjunction with the hydraulic means previously described, the manual means including an actuating lever of the bellcrank type pivotally mounted upon one of the flanges of the yoke member for articulation about an axis transverse to the axis of the disk and the duration of displacement of the members interconnected by the guide-rod means. This lever is engageable with an adjustable abutment provided upon the brake member and preferably formed with a screw theread for the axial adjustment of the position of attack of the lever against the abutment. This adjustment permits ready compensation for brake-shoe wear.

The above and other objects, features and advantages of the present invention will become more readily apparent from the following description, reference being made to the accompanying drawings in which.

Figure 2:
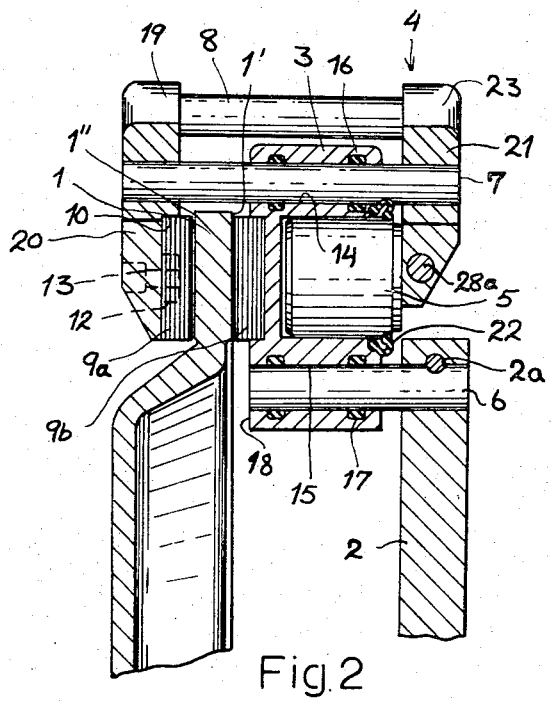
FIG. 2 is a cross-sectional view taken along the lines II—II of FIG. 1.

In FIGS. 1–4 we show a disk-brake system whose brake disk 1 is fixed to a shaft 1' journaled with respect to a support member 2 via a bearing 2'. Shaft 1' may be the axle of a wheel of an automotive vehicle in which case support 2 can be secured to the chassis or body via bolts 2". As is best seen in FIG. 2, the brake has a brake member 3 also constituting the fluid cylinder or hydraulic means which is charged with fluid in the usual manner. This brake member is provided with a passage 15 in which an elongated guide element or rod 6 is received; rod 6 constitutes, together with passage 15, the first guide-rod means interconnecting the support member 2 and the brake member 3. A pin 2a, inserted laterally into support 2 serves to hold rod 6 against axial displacement (i.e. parallel to the axis of rotation of disk 1 and transversely to the braking faces of 1' and 1" of disk 1) while a pair of rubber rings 17 are recessed in suitable grooves along the wall of passage 15 and hug guide rod 6. A brake shoe 9a is provided along rear end 18 of the brake member 3 between guide surfaces 10 and 11 and constitutes the brake surface of this member, the brake shoe being juxtaposed with face 1' of disk 1 and lying along a segment thereof. A similar brake shoe 9b is provided on flange 20 of yoke 4 and is secured to the flange in juxtaposition with face 1" of the disk by means of screws 13 threaded into nuts 12 received within the brake shoes. The latter are preferably provided with suitable brake linings of the usual type.

The yoke 4 comprises the flanges 20, 21 which extend parallel to the respective faces 1", 1' of the disk and which are interconnected by a pair of spaced guide rods 7, pins 28a serving to hold the rod 7 in place. These rods pass through respective passages 14 in the brake member 3 and constitute with these passages the second guide-rod means of the present invention. A pair of rubber rings 16, recessed in suitable annular grooves of passages 14, slidably engage the guide rods 7. A piston 5, slidably received within cylinder 3, bears upon flange 21' of yoke 4 and is surrounded by a resilient sleeve or cuff 22 preventing the entry of foreign matter between the piston 5 and cylinder 3. A compression rod 8 bears upon extensions 19 and 23 of flanges 22 and 21, respectively to stiffen the yoke 4, this compression rod 8 serving as a compression flange when hydraulic pressure is applied to the yoke via piston 5. Tension is applied during this operation to the guide elements 7.

In operation, hydraulic fluid is applied to cylinder 3 whereupon piston 5 is shifted to the right, (FIG. 2) thereby drawing brake shoe 9b against face 1" of the disk while brake shoe 9a is simultaneously urged against the other face 1' of the disk. The brake member 3, therefore, shifts slightly to the left (FIG. 2) relative to the support member 2. In each case, the rings 16 and 17, which fit tightly around the respective guide rods 6 and 7, restrict undesirable displacement of the relatively movable member with a predetermining adhesion force. When this adhesion force is exceeded by the hydraulic braking pressure, the rings 16 and 17 deform slightly whereby rods 6 and 7 slip past the rings. When the hydraulic pressure is relaxed, the deformed rings 16 and 17 tend to return to their original shape and thereby serve as restoring means for re-establishing the brake clearance.

Figure 1:
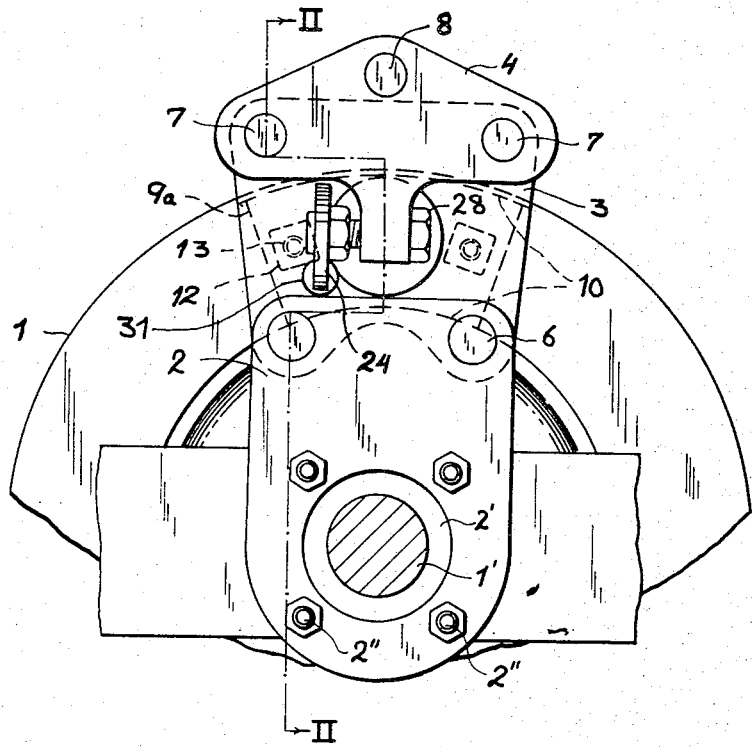
FIG. 1 is a front-elevational view of a disk-brake in accordance with the present invention.
Figure 3:
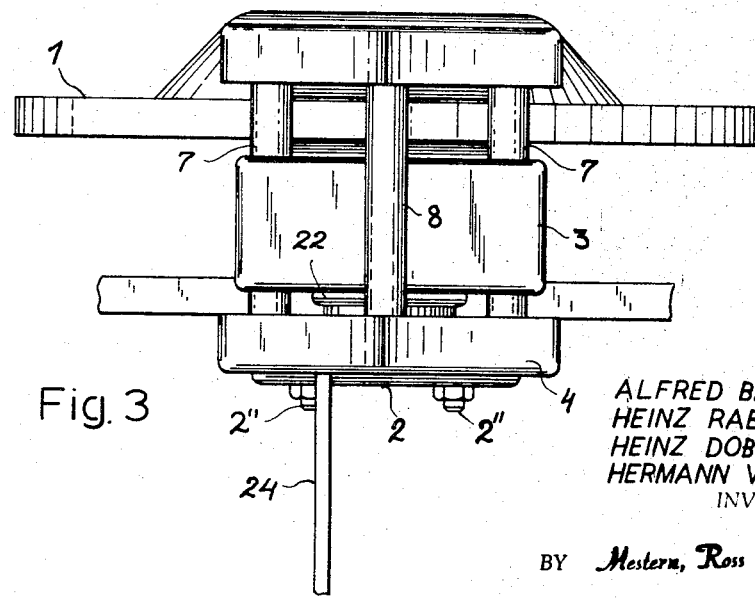
FIG. 3 is a top-plan view of the brake.
Figure 6:
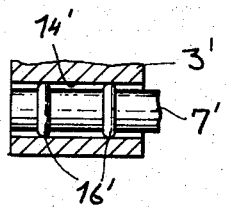
FIG. 6 is a view similar to FIG. 5 illustrating a further modification.
Figure 5:
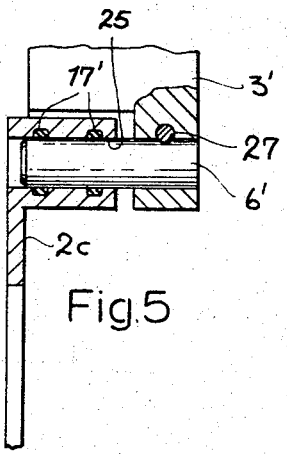
FIG. 5 is a fragmentary cross-sectional view illustrating a modified guide-rod means according to the invention.
Figure 4:
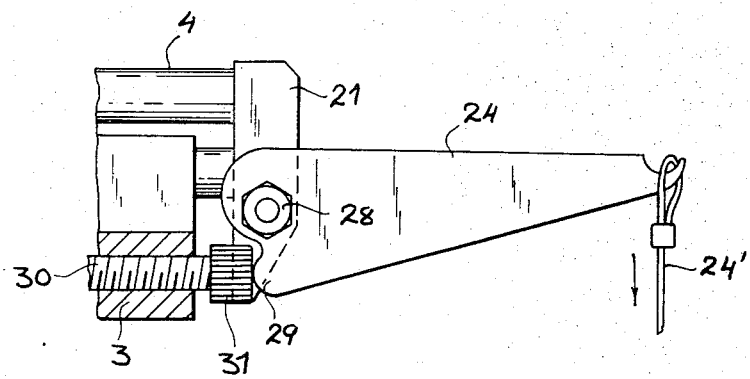
FIG. 4 is a fragmentary side-elevational view showing manual control means for the brake.

In FIGS. 5 and 6, we show modified guide-rod means interchangeable or combinable with those described with respect to FIGS. 1–4. In FIG. 5, for example, the support 2c is formed with a passage 25, continuing a first guide-rod means with a rod 6' secured to the brake member 3' by a pin 27. In this case the rubber rings 17' is provided with recesses in which the O-rings 16' are recessed and bear against the smooth-surfaced wall of passage 14' of brake member 3". It should be noted, however, that rods 6 and 6' can likewise be provided with grooves and O-rings in this manner and that if means other than guide elements 6 are employed to form the yoke by interconnecting flanges 20 and 21, the body 3 can be rigid with the guide element and flange 20, 21 provided with the requisite passages although with less effectiveness.

The brake is also provided with a manual actuating system which is here shown in its preferable context in conjunction with a hydraulic actuating means although it can also be used independently of the hydraulic means. The manual means includes a bell-crank lever 24 which can be rotated clockwise (FIG. 4) by a cable 24' connected to a pedal or brake lever. The bell-crank lever 24 is pivoted on a pin 28 along a lateral edge of the flange 21 of yoke 24 and bears at 29 against a milled head 31 of an abutment formed with a screw thread 30 and threadedly received in brake member 3. Pin 28 can be an extension of pin 28a if desired. By adjustment of abutment screw 30 to move brake member 3 with respect to yoke 4, compensation can be made for wear of the brake shoes. When the lever 24 is displaced in a clockwise sense, the sequence of events described above with regard to actuation by the hydraulic means also takes place.

The invention described and illustrated is believed to admit of many modifications within the ability of persons skilled in the art, all such modifications being considered within the spirit and scope of the appended claims.

What is claimed is:

1. A disk brake comprising a support member; a brake disk journaled for rotation relative to said support member and having a pair of opposite brake faces; a brake member provided with a respective braking surface juxtaposed with one of said faces and displaceable toward and away from said disk; a yoke member extending around the periphery of said disk while being shiftable relative to said brake member and having a respective braking surface juxtaposed with the other face of said disk; actuating means for displacing said brake and yoke members relative to one another and selectively shifting said surfaces jointly toward and away from said disk; a first pair of guide rods rigid with one of said brake and support members and extending generally transversely to said faces, said brake member being slidably mounted on said first pair of guide rods for displacement transversely to said faces; and a second pair of guide rods offset from said first pair while extending generally transversely to said faces and slidably interconnecting said brake and yoke members for relative displacement thereof transverse to said faces.

2. A disk brake comprising a support member; a brake disk journaled for rotation relative to said support member and having a pair of opposite brake faces; a brake member provided with a respective braking surface juxtaposed with one of said faces and displaceable toward and away from said disk; a yoke member extending around the periphery of said disk while being shiftable relative to said brake member and having a respective braking surface juxtaposed with the other face of said disk; fluid-responsive actuating means for displacing said brake and yoke members relative to one another and selectively shifting said surfaces jointly toward and away from said disk, said actuating means including a fluid cylinder on one of said brake and yoke members and a piston slidably received in said cylinder bearing upon the other of said brake and yoke members; a first pair of guide rods secured to one of said support and brake members and extending generally transversely to said faces, said brake member being mounted upon said first pair of rods for displacement transversely to said faces; a second pair of guide rods offset from said first pair of rods while extending generally transversely to said faces and slidably interconnecting said brake and yoke members for relative displacement thereof transverse to said faces; and resilient means surrounding at least the rods of said first pair and frictionally interconnecting said first pair of rods with said brake member.

3. A disk brake comprising a support member; a brake disk journaled for rotation relative to said support member and having a pair of opposite brake faces; a brake member provided with a respective braking surface juxtaposed with one of said faces and displaceable toward and away from said disk; a yoke member extending around the periphery of said disk while being shiftable relative to said brake member and having a respective braking surface juxtaposed with the other face of said disk; fluid-responsive actuating means for displacing said brake and yoke members relative to one another and selectively shifting said surfaces jointly toward and away from said disk, said actuating means including a fluid cylinder on said brake member and a piston slidably received in said cylinder bearing upon said yoke member; first guide-rod means extending generally transversely to said faces and slidably interconnecting said support and brake members for relative displacement thereof transverse to said faces; and second guide-rod means extending generally transversely to said faces and slidably interconnecting said brake and yoke members for relative displacement thereof transverse to said faces, said yoke member comprising a pair of axially spaced flanges extending generally parallel to said brake faces on opposite sides of said disk, said second guide-rod means including at least one elongated guide element slidably received in said brake member and interconnecting said flanges outwardly of said actuating means, and a compression element extending parallel to said guide element outwardly thereof in abutting relationship with said flanges for stiffening the latter.

4. A disk brake as defined in claim 3 wherein each of said guide-rod means includes at least one elongated guide element secured to one member of each pair of members slidably interconnected by the guide-rod means and a passage formed in the other member of the pair for receiving said guide element, and at least one annular body of elastomeric material surrounding said guide element and interposed between it and the wall of said passage and bearing upon said wall and said guide element with an adhesion pressure preventing relative displacement of the members of each pair in the absence of operation of said actuating means.

5. A disk brake as defined in claim 4 wherein said annular body is a rubber O-ring received within a recess provided in said wall.

6. A disk brake as defined in claim 4 wherein said annular body is a rubber O-ring received within an annular recess provided in said guide element.

7. A disk brake as defined in claim 3, further comprising manual-actuating means including a bell-crank lever pivotally mounted upon said yoke member for angular displacement about an axis parallel to said faces, and an abutment on said brake member engageable by said lever, said abutment being provided with a screw thread and being adjustably threaded into said brake member.

References Cited by the Examiner

UNITED STATES PATENTS

| 2,351,041 | 6/44 | Hawley | 188—73 |
| 2,575,578 | 11/51 | Bricker | 188—73 |
| 2,619,198 | 11/52 | Freund. | |
| 2,689,024 | 9/54 | Trevaskis | 188—152 |
| 2,731,112 | 1/56 | Berrows | 188—73 |
| 2,938,609 | 5/60 | Burnett. | |
| 2,966,964 | 1/61 | Brueder | 188—73 |

FOREIGN PATENTS

| 1,142,643 | 4/57 | France. |
| 844,003 | 8/60 | Great Britain. |

MILTON BUCHLER, *Primary Examiner.*

ARTHUR L. LA POINT, *Examiner.*